(12) United States Patent
Niu et al.

(10) Patent No.: US 9,614,810 B2
(45) Date of Patent: Apr. 4, 2017

(54) ADDRESS ALLOCATION PROCESSING METHOD, APPARATUS AND SYSTEM

(71) Applicant: Huawei Technologies Co., Ltd., Shenzhen (CN)

(72) Inventors: Chengguang Niu, Shenzhen (CN); Zhiwang Zhao, Shenzhen (CN); Guofeng Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 13/911,835

(22) Filed: Jun. 6, 2013

(65) Prior Publication Data

US 2013/0326014 A1 Dec. 5, 2013

Related U.S. Application Data

(63) Continuation of application No. PCT/CN2011/083434, filed on Dec. 5, 2011.

(30) Foreign Application Priority Data

Dec. 15, 2010 (CN) .......................... 2010 1 0591072

(51) Int. Cl.
*G06F 15/16* (2006.01)
*H04L 29/12* (2006.01)

(52) U.S. Cl.
CPC ...... *H04L 61/2015* (2013.01); *H04L 61/2061* (2013.01)

(58) Field of Classification Search
CPC ............... H04L 61/2015; H04L 45/586; H04L 61/2061; H04L 29/12283; G06F 15/16

USPC ........ 709/217, 228, 230, 220; 370/232, 254, 370/392
See application file for complete search history.

(56) References Cited

U.S. PATENT DOCUMENTS

| 7,739,394 | B2 * | 6/2010 | Chen ...................... H04L 29/06 370/351 |
| 7,827,310 | B1 | 11/2010 | Haberman et al. |
| 9,173,117 | B2 * | 10/2015 | Haddad ................. H04W 24/04 |

(Continued)

FOREIGN PATENT DOCUMENTS

| CN | 1455563 A | 11/2003 |
| CN | 102025798 A | 4/2011 |
| WO | WO 2007/074006 A1 | 7/2007 |

*Primary Examiner* — Tesfay Yohannes
(74) *Attorney, Agent, or Firm* — Brinks Gilson & Lione

(57) ABSTRACT

The present invention provides an address allocation processing method, apparatus and system. The method includes: receiving, by a first BRAS, a DHCP relay packet sent by a second BRAS, wherein the DHCP relay packet includes a gateway IP address and source IP address-based response information; parsing, by the first BRAS, the DHCP relay packet, acquiring the gateway IP address, and allocating an idle IP address from an acquired address pool matching the gateway IP address; encapsulating, by the first BRAS, a source IP address in the DHCP relay packet into a destination IP address in a response packet according to the source IP address-based response information, and sending the idle IP address carried in the encapsulated response packet to the second BRAS. The present invention effectively solve a problem that an address waste phenomenon exists by using a built-in DHCP server in a dual-device hot backup scene.

19 Claims, 5 Drawing Sheets

(56) References Cited

U.S. PATENT DOCUMENTS

| | | | |
|---|---|---|---|
| 2001/0054158 A1* | 12/2001 | Jarosz | H04L 43/10 726/15 |
| 2003/0167270 A1* | 9/2003 | Werme | G06F 9/06 |
| 2005/0259581 A1* | 11/2005 | Murray | G06F 9/5061 370/232 |
| 2007/0266163 A1* | 11/2007 | Xiong | H04L 12/5835 709/228 |
| 2007/0291742 A1* | 12/2007 | Schenk | H04L 29/12009 370/352 |
| 2009/0003330 A1* | 1/2009 | Li | H04L 29/12783 370/389 |
| 2009/0129386 A1* | 5/2009 | Rune | H04L 12/2881 370/392 |
| 2011/0004674 A1* | 1/2011 | Zheng | H04L 29/12264 709/220 |
| 2011/0238793 A1* | 9/2011 | Bedare | H04L 29/12283 709/220 |
| 2012/0281591 A1* | 11/2012 | Gu | H04L 12/2859 370/254 |

\* cited by examiner

ADDRESS ALLOCATION PROCESSING METHOD, APPARATUS AND SYSTEM

CROSS-REFERENCE TO RELATED APPLICATIONS

This application is a continuation of International Application No. PCT/CN2011/083434, filed on Dec. 5, 2011, which claims priority to Chinese Patent Application No. 201010591072.X, filed on Dec. 15, 2010, both of which are hereby incorporated by reference in their entireties.

TECHNICAL FIELD

The embodiments of the present invention relate to communication technologies, and particularly, to an address allocation processing method, apparatus and system.

BACKGROUND

There are three modes for Internet Protocol (Internet Protocol, IP for short) address allocation of an access device. In the first mode, a Dynamic Host Configuration Protocol (Dynamic Host Configuration Protocol, DHCP for short) server (server) built in a Broadband Remote Access Server (Broadband Remote Access Server, BRAS for short) allocates IP addressees, wherein an IP address management function, etc., are further built in the BRAS. In the second mode, a DHCP server external to a BRAS allocates an IP address, while the BRAS plays a role of a DHCP relay and maintains users' address renewing information, so as to release control and forward resources of the access device in the case that a user releases an address initiatively or does not renew the address. In the third mode, a Remote Authentication Dial In User Service (Remote Authentication Dial In User Service, RADIUS for short) server authorizes an IP address, and the BRAS need not to have an address management function. At present, in most cases, three modes that a DHCP server is built in a BRAS allocates an IP address, a DHCP server external to a BRAS allocates an IP address and a Remote Authentication Dial In User Service (Remote Authentication Dial In User Service, RADIUS for short) authorize an IP address for a private consumer are mainly adopted.

FIG. 1 is a schematic diagram illustrating a network structure of a dual-host hot backup deployment scene in the prior art in the case that a DHCP server built in a BRAS allocates an IP address, and the network structure mainly includes: a first BRAS 11, a second BRAS 12, a first Digital Subscriber Line Access Multiplexer (Digital Subscriber Line Access Multiplexer, DSLAM for short) 15, a second DSLAM 16, a first Convergent switch (Switch) 13, a second Switch 14 and a Core Router (Core Router, CR for short) 17. The state of the first BRAS 11 is a master state (Master), and the state of the second BRAS is a slave state (Slave). And, both the first BRAS 11 and the second BRAS 12 have a built-in DHCP server. For example, the first BRAS 11 has an address segment 1.1.1.0/24, and the second BRAS 12 has an address segment 2.2.2.0/24. When the first BRAS 11 works normally, if there are 100 users to be online at the first DSLAM 15 side, 100 IP addresses of 1.1.1.0/24 segment are allocated from the first BRAS 11. When failure occurs in a node of the first BRAS 11, the state of the second BRAS 12 is changed from a slave state into a master state, thus enabling the second BRAS 12 to allocate an IP address from 2.2.2.0/24 segment for new users to be online at the first DSLAM 15 side.

The inventor has found at least the following problem in the prior art when realizing the present invention: in a dual-device hot backup scene, when failure occurs in a first BRAS, an IP address is allocated by a second BRAS, thus causing that other IP address(es) in 1.1.1.0/24 segment of the first BRAS cannot be used.

SUMMARY

The embodiments of the present invention provide an address allocation processing method, apparatus and system, to solve a problem that an address waste phenomenon exists when a BRAS allocates an IP address by using a built-in DHCP server in a dual-device hot backup scene of the prior art.

The embodiments of the present invention provide an address allocation processing method, including:
receiving, by a first Broadband Remote Access Server, a Dynamic Host Configuration Protocol relay packet sent by a second Broadband Remote Access Server, wherein the Dynamic Host Configuration Protocol relay packet includes a gateway IP address and source IP address-based response information;
parsing, by the first Broadband Remote Access Server, the Dynamic Host Configuration Protocol relay packet, acquiring the gateway IP address, and allocating an idle IP address from an acquired address pool matching the gateway IP address;
encapsulating, by the first Broadband Remote Access Server, a source IP address in the Dynamic Host Configuration Protocol relay packet into a destination IP address in a response packet according to the source IP address-based response information, and sending the idle IP address carried in the encapsulated response packet to the second Broadband Remote Access Server.

The embodiments of the present invention further provide an address allocation processing method, including:
receiving, by a second Broadband Remote Access Server, a Dynamic Host Configuration Protocol request message sent by a terminal;
sending, by the second Broadband Remote Access Server, a Dynamic Host Configuration Protocol relay packet to a first Broadband Remote Access Server according to the Dynamic Host Configuration Protocol request message, wherein the Dynamic Host Configuration Protocol relay packet includes a gateway IP address and source IP address-based response information;
receiving, by the second Broadband Remote Access Server, a response packet sent by the first Broadband Remote Access Server, wherein the response packet includes an idle IP address allocated from an address pool matching the gateway IP address by the first Broadband Remote Access Server.

The embodiments of the present invention provide a Broadband Remote Access Server, including:
a first receiving module, configured to receive a Dynamic Host Configuration Protocol relay packet sent by a second Broadband Remote Access Server, wherein the Dynamic Host Configuration Protocol relay packet includes a gateway IP address and source IP address-based response information;
a first allocating module, configured to parse the Dynamic Host Configuration Protocol relay packet, acquire the gateway IP address and allocate an idle IP address from an acquired address pool matching the gateway IP address;
a response packet sending module, configured to encapsulate a source IP address in the Dynamic Host Configuration Protocol relay packet into a destination IP address in a response packet according to the source IP address-based response information, and send the idle IP address carried in the encapsulated response packet to the second Broadband Remote Access Server.

The embodiments of the present invention further provide a Broadband Remote Access Server, including:

a request message receiving module, configured to receive a Dynamic Host Configuration Protocol request message sent by a terminal;

a sending module, configured to send a Dynamic Host Configuration Protocol relay packet to a first Broadband Remote Access Server according to the Dynamic Host Configuration Protocol request message, wherein the Dynamic Host Configuration Protocol relay packet includes a gateway IP address and source IP address-based response information; a response packet receiving module, configured to receive a response packet sent by the first Broadband Remote Access Server, wherein the response packet includes an idle IP address allocated from an address pool matching the gateway IP address by the first Broadband Remote Access Server.

The embodiments of the present invention provide an address allocation processing system, including: a first Broadband Remote Access Server and a second Broadband Remote Access Server, wherein the first Broadband Remote Access Server is a Broadband Remote Access Server described as above, and the second Broadband Remote Access Server is a Broadband Remote Access Server described as above.

In the address allocation processing method, apparatus and system in the embodiments of the present invention, a first BRAS receives a DHCP relay packet sent by a second BRAS, parses the DHCP relay packet, acquires a gateway IP address in the DHCP relay packet, allocates an idle IP address from an acquired address pool matching the gateway IP address, then encapsulates a source IP address in the DHCP relay packet into a destination IP address in a response packet according to the source IP address-based response information in the DHCP relay packet, and sends the idle IP address carried in the encapsulated response packet to the second BRAS, thus effectively solving a problem that an address waste phenomenon exists when a BRAS allocates an IP address by using a built-in DHCP server in a dual-device hot backup scene of the prior art.

BRIEF DESCRIPTION OF DRAWINGS

To illustrate the technical solution under the embodiments of the present invention or the prior art more clearly, a brief introduction on the accompanying drawings which are needed in the description of the embodiments or the prior art is given below. Apparently, the accompanying drawings in the description below are merely some of the embodiments of the present invention, based on which other drawings can be acquired by the persons of ordinary skill in the art without any inventive effort.

DESCRIPTION OF EMBODIMENTS

In order to better understand the objectives, solutions and advantages of the embodiments of the present invention, the technical solutions according to the embodiments of the present invention will be described clearly and completely hereinafter with reference to the accompanying drawings in the embodiments of the present invention. Obviously, the described embodiments are merely part, but not all, of the embodiments of the present invention. All other embodiments, which can be derived by the persons of ordinary skills in the art based on the embodiments of the present invention without any inventive efforts, shall fall into the protection scope of the present invention.

Figure 1:
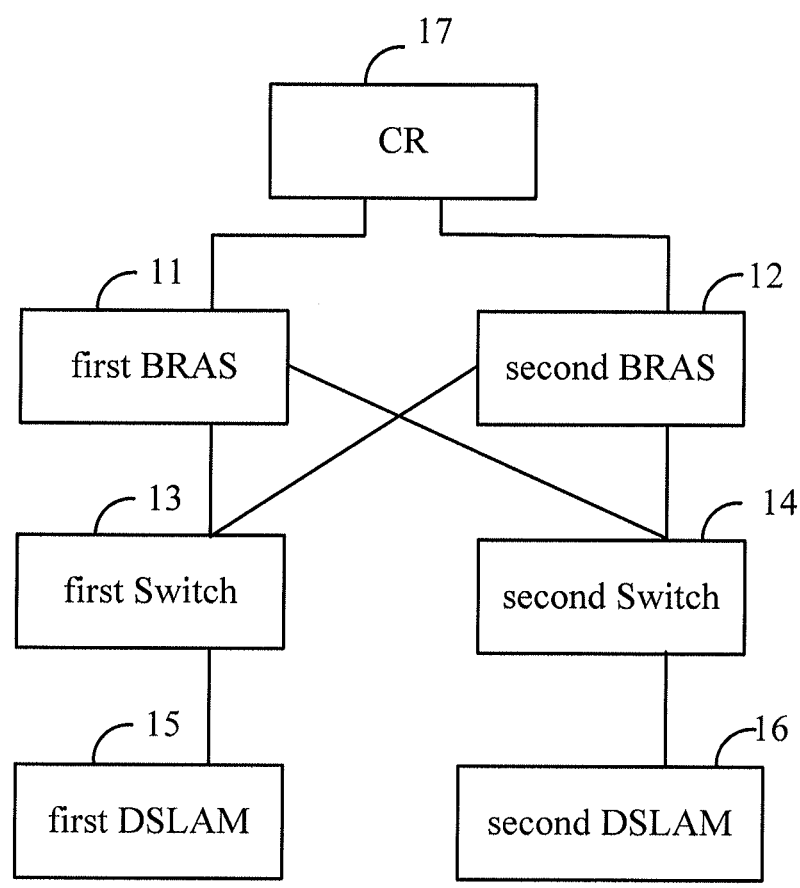
FIG. 1 is a schematic diagram illustrating a network structure of a dual-device hot backup deployment scene in the prior art.
Figure 2:
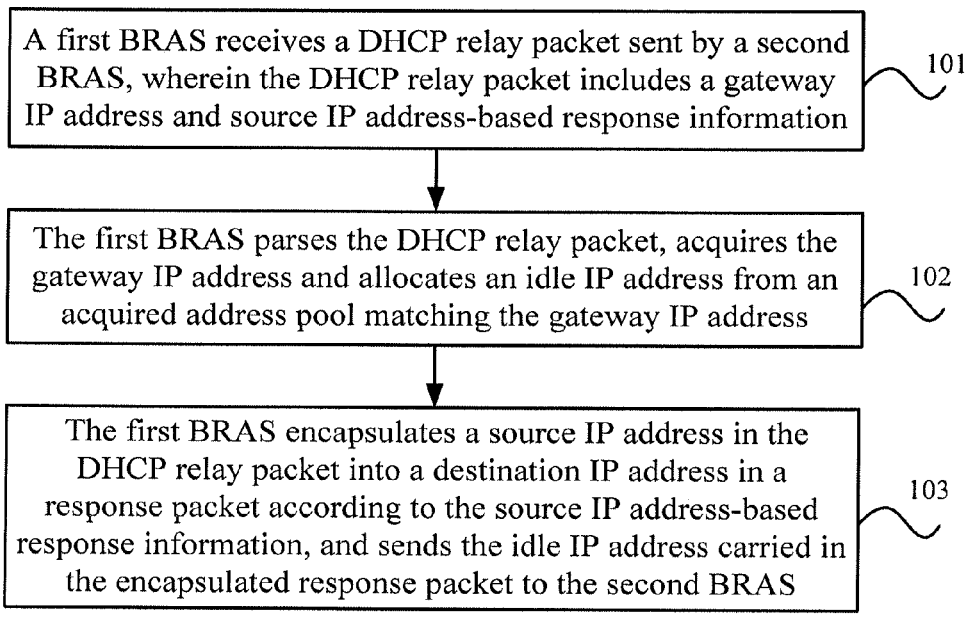
FIG. 2 is a flowchart illustrating an embodiment of an address allocation processing method according to the present invention.

FIG. 2 is a flowchart illustrating an embodiment of an address allocation processing method according to the present invention. As illustrated in FIG. 2, the method of the present embodiment includes:

101. A first BRAS receives a DHCP relay (relay) packet sent by a second BRAS server, wherein the DHCP relay packet includes a gateway IP address and source IP address-based response information.

In the present embodiment, in a dual-device hot backup scene, the first BRAS and the second BRAS have a DHCP server function and an IP address management function. A network segment managed by the first BRAS, namely, a local address pool of the first BRAS, may be backed up in the second BRAS, and a network segment managed by the second BRAS, namely, a local address pool of the second BRAS, may also be backed up in the first BRAS. And the state of the first BRAS is a master state, and the state of the second BRAS is a slave state.

When failure occurs in a node of the first BRAS, the state of the second BRAS is changed from a slave state into a master state. When there is a new access terminal to send a DHCP request message, the second BRAS receives the DHCP request message sent by the terminal, and generates a DHCP relay packet according to the DHCP request message. The DHCP relay packet includes a gateway IP address and source IP address-based response information. Particularly, the gateway IP address is a GIADDR field and is used for notifying the first BRAS of that IP address of which network segment needs to be allocated, and the source IP address-based response information is used for notifying the first BRAS of that a source IP address in the DHCP relay packet needs to be encapsulated into a destination IP address in a response packet when the response packet is encapsulated, to ensure that the first BRAS can send the response packet to the second BRAS. It should be noted that the second BRAS may insert a "source IP address-based information" option, the content of which is 1, into the DHCP relay packet when the second BRAS needs to carry the source IP address-based response information in the DHCP relay packet.

102. The first BRAS parses the DHCP relay packet, acquires the gateway IP address and allocates an idle IP address from an acquired address pool matching the gateway IP address.

In the present embodiment, upon receiving the DHCP relay packet, the first BRAS parses the DHCP relay packet, acquires the gateway IP address, finds and acquires a public network address pool matching the gateway IP address, and allocates an idle IP address from the public network address pool.

103. The first BRAS encapsulates a source IP address in the DHCP relay packet into a destination IP address in a response packet according to the source IP address-based response information, and sends the idle IP address carried in the encapsulated response packet to the second BRAS.

In the present embodiment, upon receiving the response packet, the second BRAS acquires the idle IP address in the response packet and allocates the idle IP address to the terminal.

In the present embodiment, a first BRAS receives a DHCP relay packet sent by a second BRAS, parses the DHCP relay packet, acquires a gateway IP address in the DHCP relay packet, and allocates an idle IP address from an acquired address pool matching the gateway IP address, then encapsulates a source IP address in the DHCP relay packet into a destination IP address in a response packet according to the IP address-based response information in the DHCP relay packet, and sends the idle IP address carried in the encapsulated response packet to the second BRAS, thus effectively solving a problem that an address waste phenomenon exists when a BRAS allocates an IP address by using a built-in DHCP server in a dual-device hot backup scene in the prior art.

Further, in another embodiment of the present invention, on the basis of the above embodiment, the DHCP relay packet further includes Virtual Private Network (Virtual Private Network, VPN for short) name (name) information or broadcast address allocation information.

In the present embodiment, the terminal may further access to an L3 VPN, or may request access by a Point-to-Point Protocol Over Ethernet (Point-to-Point Protocol Over Ethernet, PPPOE for short) dial. Particularly, when the terminal accesses to the L3 VPN, the second BRAS sends DHCP relay packet, and the DHCP relay packet includes VPN name information. Particularly, a "VPN name" option, the content of which is the name of the L3 VPN, is inserted into the DHCP relay packet, wherein the name may be a character string. When the terminal make a request by the PPPOE dial, the DHCP relay packet includes broadcast address allocation information. Particularly, a "broadcast address allocation information" option, the content of which is 1, is inserted into the DHCP relay packet.

In the present embodiment, when the DHCP relay packet received by the first BRAS further includes VPN name information, a private network address pool matching the gateway IP address and the VPN name information may be queried and acquired, and an idle IP address may be acquired from the private network address pool.

Or, when the DHCP relay packet received further includes broadcast address allocation information, the first BRAS may find and acquire an address pool matching the gateway IP address, and if the address pool not only includes an idle broadcast address, but also includes an idle host address and an idle network segment address, an idle host address or an idle network segment address may be allocated firstly, and after all idle host addresses and idle network addresses are allocated, an idle broadcast address may be allocated. It should be further noted that, when the DHCP relay packet does not include broadcast address allocation information, if there is only an idle broadcast address in the address pool matching the gateway IP address, the first BRAS may choose to discard the DHCP relay packet and do not make a response to the second BRAS.

Figure 3:
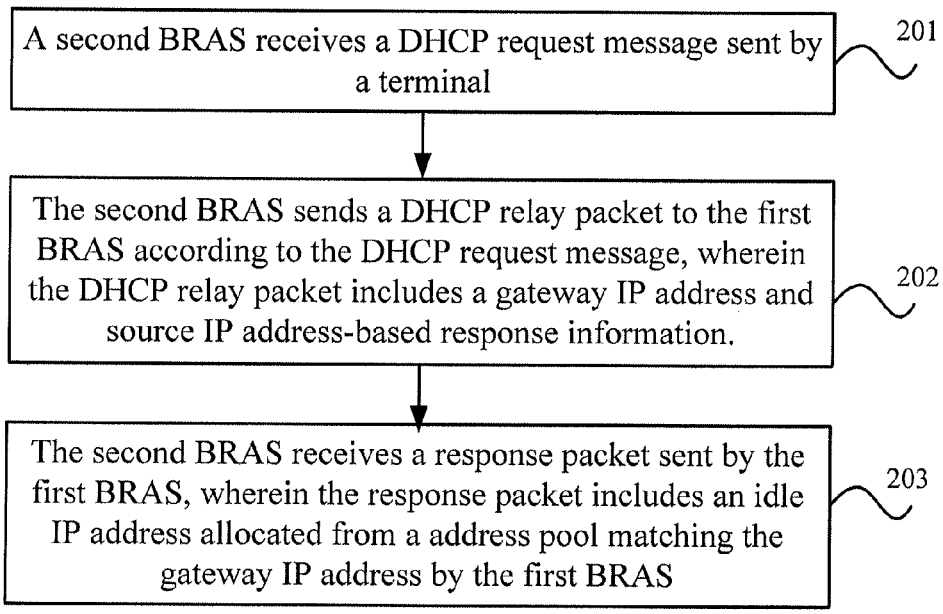
FIG. 3 is a flowchart illustrating another embodiment of an address allocation processing method according to the present invention.

FIG. 3 is a flowchart of another embodiment of an address allocation processing method according to the present invention. As illustrated in FIG. 3, the method of the present embodiment includes:

201. A second BRAS receives a DHCP request message sent by a terminal.

In the present embodiment, in a dual-device hot backup scene, the state of the first BRAS is a master state, and the state of the second BRAS is a slave state. When failure of a node of the first BRAS occurs, the state of the second BRAS is changed from a slave state into a master state. When there is a new access terminal to send a DHCP request message, the second BRAS receives a DHCP request message sent by the terminal.

202. The second BRAS sends a DHCP relay packet to the first BRAS according to the DHCP request message, wherein the DHCP relay packet includes a gateway IP address and source IP address-based response information.

In the present embodiment, the second BRAS generates a DHCP relay packet according to the DHCP request message, wherein the DHCP relay packet includes a gateway IP address and source IP address-based response information. Particularly, the gateway IP address may be a GIADDR field and is used for notifying the first BRAS of that IP address of which network segment needs to be allocated, and the source IP address-based response information is used for notifying the first BRAS of that a source IP address in the DHCP relay packet needs to be encapsulated into a destination IP address in a response packet when the response packet is encapsulated, to ensure that the first BRAS can send the response packet to the second BRAS. It should be noted that the second BRAS may insert a "source IP address-based response information" option, the content of which is 1, into the DHC relay packet when the second BRAS needs to carry the source IP address-based response information in the sent DHCP relay packet.

203. The second BRAS receives a response packet sent by the first BRAS, wherein the response packet includes an idle IP address allocated from a address pool matching the gateway IP address by the first BRAS.

In the present embodiment, upon receiving the DHCP relay packet, the first BRAS parses the DHCP relay packet, acquires the gateway IP address, finds and acquires a public network address pool matching it, and allocates an idle IP address from the public network address pool. When a response packet is encapsulated, a source IP address in the DHCP relay packet is encapsulated into a destination IP address in the response packet according to the source IP address-based response information, then the idle IP address carried in the response packet is sent to the second BRAS, so that the second BRAS receives the response packet sent by the first BRAS and allocates the idle IP address in the response packet to the terminal.

In the present embodiment, a second BRAS sends a DHCP relay packet including a gateway IP address and source IP address-based response information according to a received DHCP request message sent by a terminal, so that the first BRAS finds a address pool matching the gateway IP address, allocates an idle IP address in the address pool, then encapsulates a source IP address in the DHCP relay packet into a destination IP address in a response packet according to the source IP address-based response information, and sends the idle IP address carried in the response packet to the second BRAS, thus effectively solving a problem that an address waste phenomenon exists when a BRAS allocates an IP address by using a built-in DHCP server in a dual-device hot backup scene of the prior art.

Further, in another embodiment of the present invention, the DCHP packet may further includes VPN name information or broadcast address allocation information.

Furthermore, in another embodiment of the present invention, the method may further include:

the second BRAS records allocation information of the idle IP address in a local address pool of the first BRAS backed up in the second BRAS according to the idle IP address pool allocated in the response packet received.

In the present embodiment, in order to ensure synchronization of address pools in the first BRAS and the second BRAS, when the first BRAS allocates an idle IP address in a local address pool of the first BRAS and a response packet carrying the idle IP address is sent to the second BRAS, the second BRAS records allocation information of the idle IP address in a local address pool of the first BRAS backed up in the second BRAS according to the idle IP address.

Figure 4:
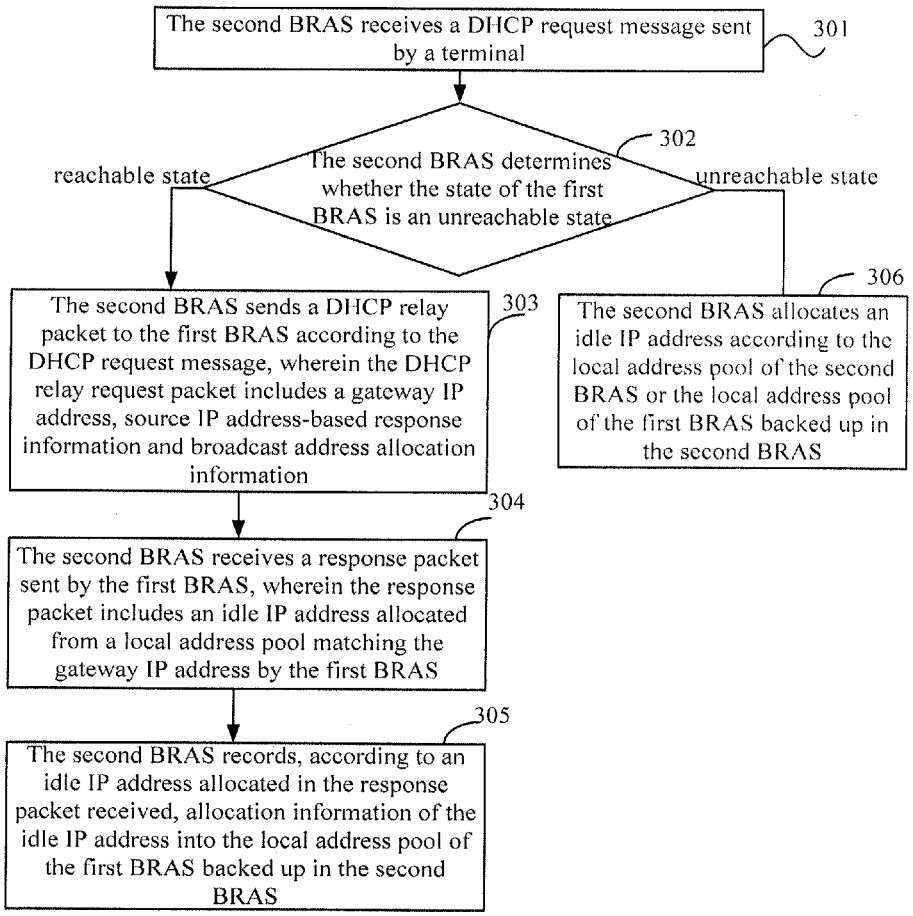
FIG. 4 is a flowchart illustrating another embodiment of an address allocation processing method according to the present invention.

FIG. 4 is a flowchart of another embodiment of an address allocation processing method according to the present invention. In the present embodiment, the technical solution of the present embodiment is described in detail by taking that the network segment managed by the first BRAS, namely, the local address pool of the first BRAS, is 1.1.1.0/24, a gateway is 1.1.1.1, the network segment managed by the second BRAS, namely, the local address pool of the second BRAS, is 2.2.2.0/24, and a gateway is 2.2.2.1/24 as examples. As illustrated in FIG. 4, the method includes:

301. The second BRAS receives a DHCP request message sent by a terminal.

In the present embodiment, the implementation of 301 is similar to that of 201 as illustrated in FIG. 3, which is not described herein in detail.

In addition, in the present embodiment, when the access side of the first BRAS is normal and failure occurs at the network side, the state of the second BRAS is changed from a slave state into a master state, and the state of the first BRAS is a slave state. The second BRAS may sends a second heartbeat packet to the first BRAS at intervals of a first predetermined time, and determines whether the first BRAS is reachable by receiving a first heartbeat packet sent by the first BRAS.

Particularly, while the first BRAS sends the first heartbeat packet to the second BRAS at intervals of the first predetermined time, the second BRAS sends a second heartbeat packet to the first BRAS, wherein the first predetermined time may be 1 s. In addition, with regard to the second BRAS, if the first heartbeat packet is not received within a second predetermined time, for example, 3 s, the state of the first BRAS is recorded as an unreachable state. When the second BRAS receives a heartbeat packet sent by the first BRAS again, the second BRAS may record the state of the first BRAS as a reachable state.

302. The second BRAS determines whether the state of the first BRAS is an unreachable state. If it is determined that the state of the first BRAS is a reachable state. 303 is performed, and if it is determined that the state of the first BRAS is an unreachable state. 306 is performed.

303. The second BRAS sends a DHCP relay packet to the first BRAS according to the DHCP request message, wherein the DHCP relay packet includes a gateway IP address, source IP address-based response information and broadcast address allocation information.

In the present embodiment, a network segment 2.2.2.0/24 managed by the second BRAS is backed up in the first BRAS, and a network segment 1.1.1.0/2 managed by the first BRAS is backed up in the first BRAS. In addition, when a terminal of the present embodiment requests access by a PPPOE dial, the second BRAS simulates a PPPOE terminal to send a DHCP request message to the first BRAS. Particularly, the second BRAS sends a DHCP relay packet carrying a gateway IP address, source IP address-based response information and broadcast address allocation information to the first BRAS. The gateway address may be denoted by a GIADDR field, which may be specifically 1.1.1.1. When the terminal makes the request by the PPPOE dial, the specific implementation that the DHCP relay packet includes broadcast address allocation information may be that a "broadcast address allocation information" option, the content of which is 1, is inserted into the DHCP request packet.

It should be noted that the terminal may further access a public network or to an L3 VPN. When the L3 VPN is accessed, the DHCP relay packet sent by the second BRAS includes VPN name information. Particularly, a "VPN name" option, the content of which is the name of the L3 VPN, is inserted into the DHCP packet, wherein the name may be a character string.

304. The second BRAS receives a response packet sent by the first BRAS, wherein the response packet includes an idle IP address allocated from a local address pool matching the gateway IP address by the first BRAS.

In the present embodiment, upon receiving the DHCP relay packet, the first BRAS finds, according to the gateway IP address in the DHCP relay packet, a public network address pool matching it, for example, network segment 1.1.1.0/24, and allocates an idle IP address from the public network address pool. It should be noted that, since the DHCP relay packet further includes broadcast address allocation information, when allocating the address, if only a broadcast address remains in the address pool, the first BRAS allocates the idle broadcast IP address according to the broadcast address allocation information included in the option, and if not only a broadcast address remains, but also other host address remains in the address pool, the first BRAS chooses the idle host address to allocate firstly, and the first BRAS may allocate the idle broadcast address according to broadcast address allocation information after all idle host addresses are allocated.

In addition, when encapsulating the response packet, the first BRAS needs to encapsulate a source IP address in the DHCP relay packet into a destination IP address in the response packet according to the source IP address-based response information, and sends the idle IP address carried in the response packet to the second BRAS, so that the second BRAS receives the response packet sent by the first BRAS.

305. The second BRAS records, according to the idle IP address allocated in the response packet received, allocation information of the idle IP address into the local address pool of the first BRAS backed up in the second BRAS, and then the method ends.

In the present embodiment, in order to ensure synchronization of address pools of the first BRAS and the second BRAS, when the first BRAS allocates an idle IP address in the local address pool of the first BRAS and sends a response packet carrying the idle IP address to the second BRAS, the second BRAS records allocation information of the idle IP address into the local address pool of the first BRAS backed up in the second BRAS according to the idle IP address.

306. The second BRAS allocates an idle IP address according to the local address pool of the second BRAS or the local address pool of the first BRAS backed up in the second BRAS.

In the present embodiment, when failure occurs in the first BRAS per se, upon receiving a DHCP request message sent by a terminal, the second BRAS may allocate an idle IP address according to a predetermined configuration rule. Particularly, the configuration rule is a configuration rule that an idle IP address is allocated firstly from the local address pool of the second BRAS or an idle IP address is allocated firstly from the local address pool of the first BRAS backed up in the second BRAS.

In the present embodiment, the second BRAS may send a second heartbeat packet to the first BRAS, the first BRAS may also send a first heartbeat packet to the second BRAS, and when the first heartbeat packet sent by the first BRAS is not received within a second predetermined time, the second BRAS records the state of the BRAS as an unreachable state, and may allocate an idle IP address to the terminal from an address pool of the second BRAS's own or the address pool of the first BRAS which is backed up, thus effectively solving a problem that an address waste phenomenon exists when a BRAS allocates an IP address by using a built-in DHCP server in a dual-host hot backup scene of the prior art.

Furthermore, on the basis of the above embodiment, the method may further include:

the second BRAS receives the first heartbeat packet sent to the second BRAS by the first BRAS;

the second BRAS sends allocation information of a local address pool of the second BRAS and allocation information of a local address pool of the first BRAS backed up in the second BRAS to the first BRAS, so that the first BRAS updates allocation information of a local address pool of the second BRAS backed up in first the BRAS according to the allocation information of the local address pool of the second BRAS, and updates allocation information of a local address pool of the first BRAS according to allocation information of the local address pool of the first BRAS backed up in the second BRAS.

In the present embodiment, when the first BRAS works normally again, the first BRAS may sends a first heartbeat packet to the second BRAS. Upon receiving the first heartbeat packet, the second BRAS may know that the first BRAS works normally, and send allocation information of a local address pool of the second BRAS and allocation information of a local address pool of the first BRAS backed up in the second BRAS to the first BRAS, so that the first BRAS updates allocation information of a local address pool of second BRAS backed up in the first BRAS according to the received allocation information of the local address pool of the second BRAS, and updates allocation information of a local address pool of the first BRAS according to the allocation information of the local address pool of the first BRAS backed up in the second BRAS.

It should be noted that, when the first BRAS updates allocation information of its own address pool and allocation information of a local address pool of the second BRAS backed up in the first BRAS, both of the first BRAS and the second BRAS pauses the access of a new terminal, and after completing the updating of the first BRAS and the second BRAS, master and slave states of the first BRAS and the second BRAS may be re-determined according to master-slave decision protocol (for example, Virtual Router Redundancy Protocol (Virtual Router Redundancy Protocol, VRRP for short), wherein the master and slave states of the first BRAS and the second BRAS may be determined by the master-slave decision protocol based on parameters, such as, priority level, switching time, etc.

Furthermore, on the basis of the above embodiment, when 304 is performed, namely, when the second BRAS sends the DHCP relay packet to the first BRAS, the first BRAS performs parsing and acquires the gateway IP address, and discards the packet if there is no idle IP address in the found and acquired address pool matching the gateway IP address. Thus, 307 is performed if the second BRAS fails to receive a response packet within a predetermined time.

Figure 5:
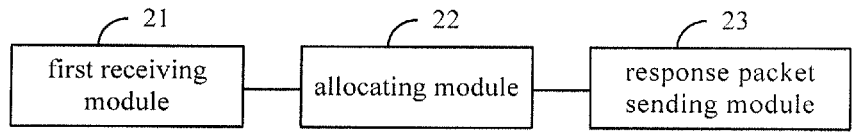
FIG. 5 is a schematic structure diagram illustrating an embodiment of a BRAS according to the present invention.

FIG. 5 is a schematic structure diagram illustrating an embodiment of a BRAS according to the present invention. As illustrated in FIG. 5, the BRAS of the present embodiment includes: a first receiving module 21, a first allocating module 22 and a response packet sending module 23. The first receiving module 21 is configured to receive a DHCP relay packet sent by a second BRAS, wherein the DHCP relay packet includes a gateway IP address and source IP address-based response information; the first allocating module 22 is configured to parse the DHCP relay packet, acquire the gateway IP address and allocate an idle address from an acquired address pool matching the gateway IP address; the response packet sending module 23 is configure to encapsulate a source IP address in the DHCP relay packet into a destination IP address in a response packet according to the source IP address-based response information, and send the idle IP address carried in the encapsulated response packet to the second BRAS.

The BRAS of the present embodiment may be used to perform the technical solution of the method embodiment illustrated in FIG. 2, the principle of which is similar and is not described herein in detail.

In the present embodiment, a first BRAS receives a DHCP relay packet sent by a second BRAS, parses the DHCP relay packet, acquires a gateway IP address in the DHCP relay packet, and allocates an idle IP address from an acquired address pool matching the gateway IP address, then encapsulates a source IP address in the DHCP relay packet into a destination IP address in a response packet according to the source IP address-based response information in the DHCP relay packet, and sends the idle IP address carried in the encapsulated response packet to the second BRAS, thus effectively solving a problem that an address waste phenomenon exists when a BRAS allocates an IP address by using a built-in DHCP server in a dual-device hot backup scene of the prior art.

Further, in another embodiment of the present invention, when the DHCP relay packet includes VPN name information, the first allocating module 21 is configured to parse the DHCP relay packet, acquire the gateway IP address and the VPN name information, and allocate an idle IP address from an acquired address pool matching the gateway IP address and the VPN name information. Particularly, the address pool may be a private network address pool.

Or, when the DHCP relay packet includes broadcast address allocation information, the first allocating module 22 may be configured to parse the DHCP relay packet, acquire the gateway IP address, acquire an address pool matching the gateway IP address, and allocate an idle broadcast IP address if there is only an idle broadcast address in the address pool matching the gateway IP address in the first BRAS.

Figure 6:
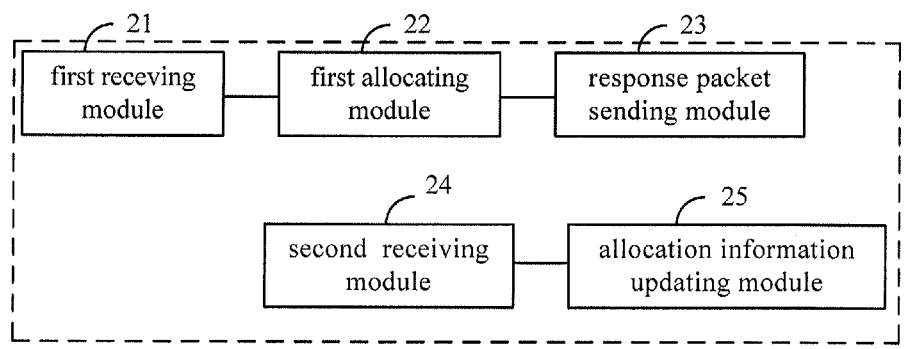
FIG. 6 is a schematic structure diagram illustrating another embodiment of a BRAS according to the present invention.

FIG. 6 is a schematic structure diagram of another embodiment of a BRAS according to the present invention. As illustrated in FIG. 6, on the basis of the above embodiment, the BRAS of the present embodiment may further include: a second receiving module 24 and allocation information updating module 25.

Particularly, the second receiving module 24 is configured to receive allocation information of a local address pool of the second BRAS and allocation information of a local address pool of the first BRAS backed up in the second BRAS sent by the second BRAS; the allocation information updating module 25 is configured to update allocation information of a local address pool of the second BRAS backed up in the first BRAS according to the allocation information of the local address pool of the second BRAS, and update allocation information of a local address pool of the first BRAS according to the allocation information of the local address pool of the first BRAS backed up in the second BRAS.

In the present embodiment, the second BRAS may send a second heartbeat packet to the first BRAS, and the first BRAS may receive the second heartbeat packet, and send a first heartbeat detection packet to the second BRAS when the failure occurs at the access side of the first BRAS and the network side is normal.

In addition, if the state of the first BRAS is a reachable state again, the first BRAS may send the second heartbeat packet to the second BRAS, and receive, by the second receiving module 24, allocation information of a local address pool of the second BRAS and allocation information of a local address pool of the first BRAS backed up in the second BRAS sent by the second BRAS, so that the allocation information updating module 25 updates allocation information of a local address pool of the second BRAS backed up in the first BRAS according to the allocation information of the local address pool of the second BRAS, and updates allocation information of a local address pool of the first BRAS according to the allocation information of the local address pool of the first BRAS backed up in the second BRAS.

Figure 7:
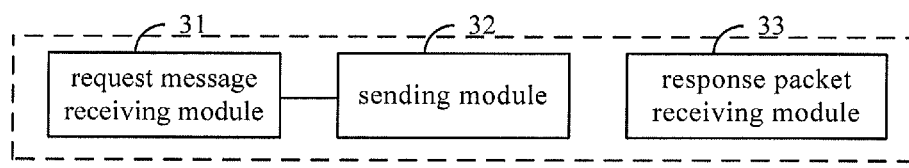
FIG. 7 is a schematic structure diagram illustrating another embodiment of a BRAS according to the present invention.

FIG. 7 is a schematic structure diagram of another embodiment of a BRAS according to the present invention. As illustrated in FIG. 7, the BRAS of the present embodiment includes: a request message receiving module 31, a sending module 32, and a response packet receiving module 33. The request message receiving module 31 is configured to receive a DHCP request message sent by a terminal; the sending module 32 is configured to send a DHCP relay packet to a first BRAS according to the DHCP request message, wherein the DHCP relay packet includes a gateway IP address and source IP address-based response information; the response packet receiving module 33 is configured to receive a response packet sent by the first BRAS, wherein the response packet includes an idle IP address allocated from an address pool matching the gateway IP address by the first BRAS.

The BRAS of the present embodiment may be used to perform the technical solution of the method embodiment illustrated in FIG. 3, the principle of which is similar and is not described herein in detail.

In the present embodiment, a second BRAS sends a DHCP relay packet including a gateway IP address and source IP address-based response information according to a received DHCP request message sent by a terminal to the first BRAS, so that the first BRAS finds a address pool matching the gateway IP address and allocates an idle IP address in the address pool, then encapsulates a source IP address in the DHCP relay packet into a destination IP address in a response packet according to the source IP address-based response information, and sends the idle IP address carried in the response packet to the second BRAS, thus effectively solving a problem that an address waste phenomenon exists when a BRAS allocates an IP address by using a built-in DHCP server in a dual-device hot backup scene of the prior art.

Figure 8:
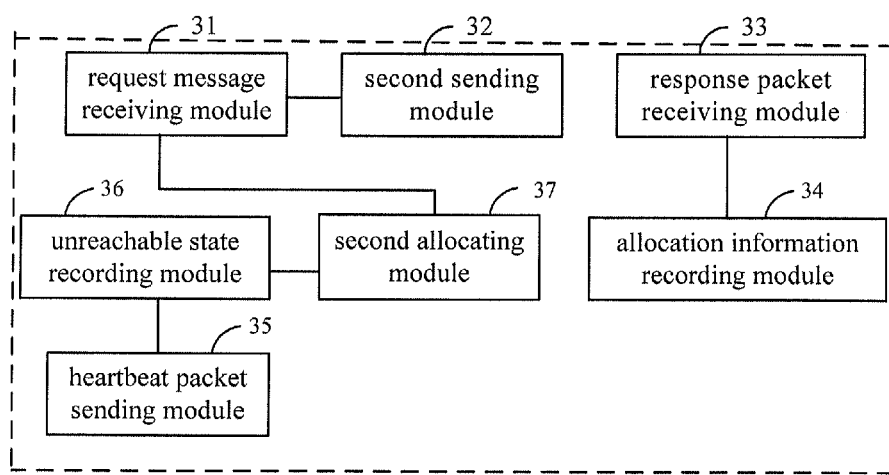
FIG. 8 is a schematic structure diagram illustrating another embodiment of a BRAS according to the present invention.

FIG. 8 is a schematic structure diagram of another embodiment of a BRAS according to the present invention. As illustrated in FIG. 8, on the basis of the above embodiment, the BRAS further includes: an allocation information recording module 34, a heartbeat packet sending module 35, an unreachable state recording module 36 and a second allocating module 37.

Particularly, the allocation information recording module 34 is configured to record allocation information of the idle IP address into a local address pool of the first BRAS backed up in the second BRAS according to the allocated idle IP address in the received response packet; the heartbeat packet sending module 35 is configured to send a second heartbeat packet to the first BRAS at intervals of a first predetermined time; the unreachable state recording module 36 is configured to record the state of the first BRAS as an unreachable state if a first heartbeat packet sent by the first BRAS is not received during a second predetermined time; the second allocating module 37 is configured to allocate an idle IP address according to a local address pool of the second BRAS or a local address pool of the first BRAS backed up in the second BRAS when it is determined that the state of the first BRAS is an unreachable state.

In addition, the second BRAS may receive the first heartbeat packet sent by the first BRAS, and send allocation information of a local address pool of the second BRAS and allocation information of a local address pool of the first BRAS backed up in the second BRAS, so that the first BRAS updates allocation information of a local address pool of the second BRAS backed up in first the BRAS according to the allocation information of the local address pool of the second BRAS, and updates allocation information of a local address pool of the first BRAS according to allocation information of the local address pool of the first BRAS backed up in the second BRAS.

The BRAS of the present embodiment may be used to perform the technical solution of the method embodiment illustrated in FIG. 4, the principle of which is similar and is not described herein in detail.

In the present embodiment, the first BRAS and the second BRAS may determine whether failure occurs in a link of the first BRAS or failure occurs in the first BRAS per se by sending a heartbeat packet to the other, and, when failure occurs in the first BRAS per se, an idle IP address may be allocated to a terminal through an address pool of the second BRAS per se or a address pool of the first BRAS which is backed up, thus solving a problem more effectively that an address waste phenomenon exists when a BRAS allocates an IP address by using a built-in DHCP server in a dual-device hot backup scene of the prior art.

Figure 9:
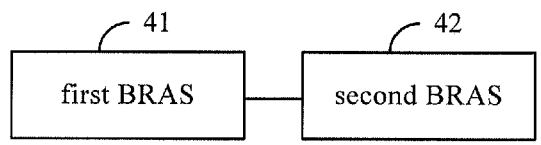
FIG. 9 is a schematic structure diagram illustrating an embodiment of an address allocation processing system according to the present invention.

FIG. 9 is a schematic structure diagram of an embodiment of an address allocation processing system according to the present invention. As illustrated in FIG. 9, the system includes a first BRAS 41 and a second BRAS 42. The first BRAS 41 may be a BRAS illustrated in FIG. 5 or FIG. 6, and may perform the technical solution of method embodiment illustrated in FIG. 2, and the second BRAS 42 may be a BRAS illustrated in FIG. 7 or FIG. 8, and may perform the technical solution of method embodiment illustrated in FIG. 3 or FIG. 4, which are not described herein in detail.

In the present embodiment, a second BRAS sends a DHCP relay packet including a gateway IP address and source IP address-based response information according to a received DHCP request message sent by a terminal to the first BRAS, so that the first BRAS finds an address pool matching the gateway IP address, allocates an idle IP address in the address pool; then the first BRAS encapsulates a source IP address in the DHCP relay packet into a destination IP address in a response packet according to the source IP address-based response information, and sends the idle IP address carried in the encapsulated response packet to the second BRAS, thus effectively solving a problem that an address waste phenomenon exists when a BRAS allocates an IP address by using a built-in DHCP server in a dual-device hot backup scene of the prior art.

Those skilled in the art may understand that all of or part of the steps of the method in any of the embodiments above may be implemented by a hardware relevant to a program or instruction. The above program may be stored in a computer readable storage medium. The program executes the steps of above method embodiments when the program is executed. The above storage medium may include various media which may store program codes, such as ROM, RAM, or a magnetic disk, or an optical disk, etc.

It should be noted that the foregoing embodiments are only illustrative, and not for use in limiting the technical solution of the present invention. Although the present invention is described in detail with reference to the above embodiments, those skilled in the art should understand that modifications to the solutions recited in above embodiments or substitutions to part of technical features therein are possible. Such modifications or substitutions will not make the nature of corresponding solutions depart from the spirit and scopes of the solutions of the embodiments of the present invention.

What is claimed is:

1. An address allocation processing method, comprising:
   receiving, by a first Broadband Remote Access Server (BRAS) which has a DHCP server function, a Dynamic Host Configuration Protocol (DHCP) relay packet sent by a second BRAS which has the DHCP server function when a state of the second BRAS is changed from a slave state into a master state in a dual-device hot backup scene, wherein the DHCP relay packet comprises a gateway IP address and source IP address-based response information;
   parsing, by the first BRAS, the DHCP relay packet, acquiring the gateway IP address, and allocating an idle IP address from an acquired address pool matching the gateway IP address;
   encapsulating, by the first BRAS, a source IP address in the DHCP relay packet into a destination IP address in a response packet according to the source IP address-based response information, and sending the idle IP address carried in the encapsulated response packet to the second BRAS.

2. The address allocation processing method according to claim 1, wherein the DHCP relay packet further comprises Virtual Private Network name information, and the parsing, by the first BRAS, the DHCP relay packet, acquiring the gateway IP address, and allocating an idle IP address from an acquired address pool matching the gateway IP address, comprises:
   parsing, by the first BRAS, the DHCP relay packet, acquiring the gateway IP address and the Virtual Private Network name information, and allocating an idle IP address from an acquired address pool matching the gateway IP address and the Virtual Private Network name information.

3. The address allocation processing method according to claim 1, wherein the DHCP relay packet further comprises broadcast address allocation information, and the allocating an idle IP address from an acquired address pool matching the gateway IP address, comprises:
   allocating an idle broadcast IP address if there is only an idle broadcast address in the address pool matching the gateway IP address in the first BRAS.

4. The address allocation processing method according to claim 3, further comprising:
   receiving, by the first BRAS, allocation information of a local address pool of the second BRAS and allocation information of a local address pool of the first BRAS backed up in the second BRAS sent by the second BRAS;
   updating, by the first BRAS, allocation information of a local address pool of the second BRAS backed up in the first BRAS according to the allocation information of the local address pool of the second BRAS, and updating allocation information of a local address pool of the first BRAS according to the allocation information of the local address pool of the first BRAS backed up in the second BRAS.

5. An address allocation processing method, comprising:
   receiving, by a second Broadband Remote Access Server (BRAS) which has a DHCP server function, a Dynamic Host Configuration Protocol request message sent by a terminal;
   sending, by the second BRAS, a Dynamic Host Configuration Protocol (DHCP) relay packet to a first BRAS which has the DHCP server function according to the DHCP request message when a state of the second BRAS is changed from a slave state into a master state in a dual-device hot backup scene, wherein the DHCP relay packet comprises a gateway IP address and source IP address-based response information;
   receiving, by the second BRAS, a response packet sent by the first BRAS, wherein the response packet comprises an idle IP address allocated from an address pool matching the gateway IP address by the first Broadband Remote Access Server.

6. The address allocation processing method according to claim 5, further comprising:
   recording, by the second BRAS, allocation information of the idle IP address into a local address pool of the first BRAS backed up in the second BRAS according to the idle IP address allocated in the response packet received.

7. The address allocation processing method according to claim 6, further comprising:
   sending, by the second BRAS, a second heartbeat packet to the first BRAS at intervals of a first predetermined time;
   recording, by the second BRAS, the state of the first BRAS as an unreachable state if a first heartbeat packet sent by the first BRAS is not received within a second predetermined time.

8. The address allocation processing method according to claim 7, further comprising:
   allocating, by the second BRAS, an idle IP address according to a local address pool of the second BRAS or a local address pool of the first BRAS backed up in the second BRAS if it is determined that the state of the first BRAS is an unreachable state.

9. The address allocation processing method according to claim 8, further comprising:
receiving, by the second BRAS, a first heartbeat packet sent by the first BRAS;
sending, by the second BRAS, allocation information of a local address pool of the second BRAS and allocation information of a local address pool of the first BRAS backed up in the second BRAS to the first B BRAS, so that the first BRAS updates allocation information of a local address pool of the second BRAS backed up in the first BRAS according to the allocation information of the local address pool of the second BRAS, and updates allocation information of a local address pool of the first BRAS according to the allocation information of the local address pool of the first BRAS backed up in the second BRAS.

10. A Broadband Remote Access Server (BRAS), which has a DHCP server function, comprising a processor and a non-transitory storage medium accessible to the processor, the non-transitory storage medium is configured to store:
a first receiving module, configured to receive a Dynamic Host Configuration Protocol (DHCP) relay packet sent by a second BRAS which has the DHCP server function when a state of the second BRAS is changed from a slave state into a master state in a dual-device hot backup scene, wherein the DHCP relay packet comprises a gateway IP address and source IP address-based response information;
a first allocating module, configured to parse the DHCP relay packet, acquire the gateway IP address and allocate an idle address from an acquired address pool matching the gateway IP address;
a response packet sending module, configured to encapsulate a source IP address in the DHCP relay packet into a destination IP address in a response packet according to the source IP address-based response information, and send the idle IP address carried in the encapsulated response packet to the second BRAS.

11. The BRAS according to claim 10, further comprising:
a second receiving module, configured to receive allocation information of a local address pool of the second BRAS and allocation information of a local address pool of the first BRAS backed up in the second BRAS sent by the second BRAS;
an allocation information updating module, configured to update allocation information of a local address pool of the second BRAS backed up in the first BRAS according to the allocation information of the local address pool of the second BRAS, and update allocation information of a local address pool of the first BRAS according to the allocation information of the local address pool of the first BRAS backed up in the second BRAS.

12. A Broadband Remote Access Server (BRAS), which has a DHCP server function, comprising a processor and a non-transitory storage medium accessible to the processor, the non-transitory storage medium is configured to store:
a request message receiving module, configured to receive a Dynamic Host Configuration Protocol (DHCP) request message sent by a terminal;
a sending module, configured to send a DHCP relay packet to a first BRAS which has the DHCP server function according to the DHCP request message when a state of the second BRAS is changed from a slave state into a master state in a dual-device hot backup scene, wherein the DHCP relay packet comprises a gateway IP address and source IP address-based response information;
a response packet receiving module, configured to receive a response packet sent by the first BRAS, wherein the response packet comprises an idle IP address allocated from an address pool matching the gateway IP address by the first BRAS.

13. The BRAS according to claim 12, further comprising:
an allocation information recording module, configured to record allocation information of the idle IP address into a local address pool of the first BRAS backed up in the second BRAS according to the idle IP address allocated in the response packet received.

14. The BRAS according to claim 13, further comprising:
a heartbeat packet sending module, configured to send a second heartbeat packet to the first BRAS at intervals of a first predetermined time;
an unreachable state recording module, configured to record the state of the first BRAS as an unreachable state if a first heartbeat packet sent by the first BRAS is not received within a second predetermined time.

15. The BRAS according to claim 14, further comprising:
a second allocating module, configured to allocate an idle IP address according to a local address pool of the second BRAS or a local address pool of the first BRAS backed up in the second BRAS if it is determined that the state of the first BRAS is an unreachable state.

16. The address allocation processing method according to claim 1, wherein the first BRAS receives the DHCP relay packet from a second BRAS when a state of the second BRAS is changed from a slave state into a master state in a dual-device hot backup scene.

17. The address allocation processing method according to claim 5, further comprising:
sending, by the second BRAS, the DHCP relay packet to a first BRAS according to the DHCP request message when a state of the second BRAS is changed from a slave state into a master state in a dual-device hot backup scene.

18. The BRAS according to claim 10, wherein the first receiving module is configured to receive the DHCP relay packet when a state of the second BRAS is changed from a slave state into a master state in a dual-device hot backup scene.

19. The BRAS according to claim 12, wherein the sending module is configured to send the DHCP relay packet to the first BRAS according to the DHCP request message, when a state of the second BRAS is changed from a slave state into a master state in a dual-device hot backup scene.

* * * * *